(12) United States Patent
Jia et al.

(10) Patent No.: US 11,610,383 B2
(45) Date of Patent: Mar. 21, 2023

(54) DISPLAY MODULE AND METHOD FOR MANUFACTURING SAME, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Tao Jia, Beijing (CN); Hao Wu, Beijing (CN); Wenfeng Jin, Beijing (CN); Libao Cui, Beijing (CN); Site Cai, Beijing (CN); Litao Fan, Beijing (CN); Jiaqiang Wang, Beijing (CN); Gang Ci, Beijing (CN); Meijuan An, Beijing (CN); Jia Meng, Beijing (CN); Dang Yang, Beijing (CN); Xiao Ma, Beijing (CN); Xuewen Cao, Beijing (CN); Zhiqiang Fan, Beijing (CN); Zheng Zhang, Beijing (CN); Bangcan Xue, Beijing (CN); Dong Zhang, Beijing (CN); Yanjun Liu, Beijing (CN); Liguang Deng, Beijing (CN); Feiwu Yuan, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/460,035

(22) Filed: Aug. 27, 2021

(65) Prior Publication Data

US 2022/0100983 A1    Mar. 31, 2022

(30) Foreign Application Priority Data

Sep. 28, 2020 (CN) .......................... 202011041539.3

(51) Int. Cl.
*G06V 10/141* (2022.01)
*G06V 40/13* (2022.01)
(Continued)

(52) U.S. Cl.
CPC ......... *G06V 10/141* (2022.01); *G02B 6/0055* (2013.01); *G02B 6/0068* (2013.01);
(Continued)

(58) Field of Classification Search
None
See application file for complete search history.

(56) References Cited

U.S. PATENT DOCUMENTS

2017/0372114 A1* 12/2017 Cho ....................... G06F 3/0412
2019/0147214 A1* 5/2019 Lee ....................... H01L 51/0097
382/124

(Continued)

FOREIGN PATENT DOCUMENTS

CN     103439833 A     12/2013
CN     111339815 A  *  6/2020  ........... G06K 9/0004
(Continued)

OTHER PUBLICATIONS

CN202011041539.3 first office action.

*Primary Examiner* — Shan Liu
(74) *Attorney, Agent, or Firm* — IPro, PLLC

(57) ABSTRACT

Provided is a display module, including: a shell; a display panel, wherein the display panel is disposed in the shell and is connected to the shell; a first light emitting component, wherein the first light emitting component is connected to the display panel and is configured to emit light of a target wavelength; and a fingerprint recognition sensor, wherein the fingerprint recognition sensor is disposed between the shell and the display panel and is fixedly connected to the shell; an orthographic projection of the fingerprint recogni- (Continued)

tion sensor onto the display panel and an orthographic projection of the first light emitting component onto the display panel do not overlap; and the fingerprint recognition sensor is configured to recognize a fingerprint based on received light of the target wavelength reflected by an obstacle.

18 Claims, 5 Drawing Sheets

(51) Int. Cl.
*G06V 10/147* (2022.01)
*F21V 8/00* (2006.01)
*G02F 1/1333* (2006.01)
*G02F 1/1335* (2006.01)
*G02F 1/1339* (2006.01)

(52) U.S. Cl.
CPC ......... *G02B 6/0083* (2013.01); *G02F 1/1339* (2013.01); *G02F 1/13338* (2013.01); *G02F 1/133504* (2013.01); *G02F 1/133553* (2013.01); *G06V 10/147* (2022.01); *G06V 40/1318* (2022.01); *G06V 40/1324* (2022.01)

(56) References Cited

U.S. PATENT DOCUMENTS

2019/0154907 A1    5/2019  Zhong
2020/0184183 A1*   6/2020  Chang .................. G06V 40/13

FOREIGN PATENT DOCUMENTS

| CN | 111339821 A | * | 6/2020 | ......... G02F 1/13338 |
| CN | 111476218 A |   | 7/2020 | |
| CN | 111596489 A | * | 8/2020 | ....... G02F 1/133615 |

* cited by examiner

DISPLAY MODULE AND METHOD FOR MANUFACTURING SAME, AND DISPLAY DEVICE

CROSS-REFERENCE TO RELATED APPLICATION

This application is based on and claims priority to the Chinese Patent Application No. 202011041539.3, filed on Sep. 28, 2020 and entitled "DISPLAY DEVICE", the disclosure of which is herein incorporated by reference in its entirety.

TECHNICAL FIELD

The present disclosure relates to the field of display technologies, and more particularly, to a display module and a method for manufacturing the same, and a display device.

BACKGROUND

A liquid crystal display module may have a fingerprint recognition function to recognize the identity of users.

In the related art, the liquid crystal display module includes a shell, a display substrate that is fixedly connected to the shell, a light emitting element and a fingerprint recognition sensor. When a finger of a user touches a fingerprint detection area of the display substrate, the finger of the user may reflect the light emitted by the light emitting element to the fingerprint recognition sensor, which in turn recognizes the position of the ridges and valleys of the finger according to the received light, so as to perform the fingerprint recognition function.

SUMMARY

The present disclosure provides a display module and a method for manufacturing the same, and a display device. The technologies are as follows:

In one aspect, a display module is provided, including:
a shell;
a display panel, wherein the display panel is disposed in the shell and is connected to the shell;
a first light emitting component, wherein the first light emitting component is connected to the display panel and is configured to emit light of a target wavelength; and
a fingerprint recognition sensor, wherein the fingerprint recognition sensor is disposed between the shell and the display panel and is fixedly connected to the shell; an orthographic projection of the fingerprint recognition sensor onto the display panel and an orthographic projection of the first light emitting component onto the display panel do not overlap; the fingerprint recognition sensor is configured to recognize a fingerprint based on received light of the target wavelength reflected by an obstacle.

Optionally, the display panel includes a cover, a display substrate, a backlight source and a connection structure;
the cover is connected to the shell; and the display substrate, the backlight source and the connection structure are located in a region enclosed by the cover and the shell;
the display substrate is connected to a side of the cover close to the shell; a side of the display substrate distal from the cover is connected to an end of the connection structure; and a side of the connection structure distal from the display substrate is connected to the backlight source; and the first light emitting component is disposed on a side of the connection structure distal from the backlight source and is connected to another end of the connection structure.

Optionally, the backlight source includes a second light emitting component and a light guide plate;
the second light emitting component is disposed on the side of the connection structure distal from the display substrate; and an orthographic projection of the second light emitting component onto the connection structure and an orthographic projection of the first light emitting component onto the connection structure do not overlap; and
the light guide plate is disposed on a side of the second light emitting component distal from the first light emitting component.

Optionally, the connection structure includes a substrate, and a first connection conductor and a second connection conductor which are respectively disposed on both sides of the substrate; and
both of the display substrate and the first light emitting component are connected to the first connection conductor; and the second light emitting component is connected to the second connection conductor.

Optionally, the first connection conductor and the second connection conductor are made of copper.

Optionally, the display panel further includes a first adhesive;
one side of the first adhesive is connected to a side of the connection structure distal from the display substrate, and the other side of the first adhesive is connected to the light guide plate;
wherein
the first adhesive is provided with a first via; and the second light emitting component is connected to the connection structure through the first via.

Optionally, the display panel further includes a light-shielding component;
the light-shielding component is disposed between the display substrate and the backlight source; and an orthographic projection of the light-shielding component onto the display substrate covers an orthographic projection of the second light emitting component onto the display substrate.

Optionally, the orthographic projection of the light-shielding component onto the display substrate partially overlaps with an orthographic projection of the light guide plate onto the display substrate.

Optionally, the display panel further includes a reflection sheet, a diffusion sheet and a prism sheet;
the reflection sheet is disposed on a side of the backlight source distal from the display substrate, and is configured to reflect light emitted by the backlight source;
the diffusion sheet is disposed on a side of the backlight source close to the display substrate, and is configured to diffuse the light emitted by the backlight source; and
the prism sheet is disposed on a side of the diffusion sheet close to the display substrate, and is configured to increase luminance of the light emitted by the backlight source.

Optionally, the reflection sheet, the diffusion sheet and the prism sheet are all made of materials capable of transmitting the light of the target wavelength.

Optionally, the display panel further includes a second adhesive;
the second adhesive is disposed between the cover and the display substrate, and is configured to connect the cover and the display substrate.

the display module further includes a flexible printed circuit;

one end of the flexible printed circuit is connected to a side of the display substrate distal from the shell, and the other end of the flexible printed circuit is disposed between the display substrate and the shell; and the flexible printed circuit is provided with a second via; the first light emitting component is connected to the display panel through the first via.

Optionally, the display module further includes a sealant; and the sealant is disposed on a side of the display panel close to the shell, and the sealant is fixedly connected to the display panel.

Optionally, the sealant is provided with a third via; and an orthographic projection of the third via onto the display panel covers the fingerprint recognition sensor.

Optionally, the display panel includes a display area and the display area includes a fingerprint recognition area; and an orthographic projection of the fingerprint recognition sensor onto the display panel is located within the fingerprint recognition area; and the first light emitting component comprises at least one first light emitting element each emitting the light of the target wavelength, and the light of the target wavelength emitted by the at least one first light emitting element is irradiated to the fingerprint recognition area.

Optionally, each of the at least one first light emitting element is an infrared radiation light emitting diode; and the target wavelength is greater than or equal to 850 nm.

Optionally, the display module further includes a fingerprint recognition driving circuit;

the fingerprint recognition driving circuit is connected to the first light emitting component and is configured to drive the first light emitting component to emit the light of the target wavelength; and the fingerprint recognition driving circuit is further connected to the fingerprint recognition sensor, and is configured to supply a driving signal to the fingerprint recognition sensor.

Optionally, the display panel includes a display area and the display area includes a fingerprint recognition area; an orthographic projection of the fingerprint recognition sensor onto the display panel is located within the fingerprint recognition area; the display panel further includes a first adhesive, a light-shielding component, a reflection sheet, a diffusion sheet, a prism sheet, a second adhesive, a flexible printed circuit, a sealant and a fingerprint recognition driving circuit;

one side of the first adhesive is connected to a side of the connection structure distal from the display substrate, and the other side of the first adhesive is connected to the light guide plate; wherein the first adhesive is provided with a first via; and the second light emitting component is connected to the connection structure through the first via;

the light-shielding component is disposed between the display substrate and the backlight source; an orthographic projection of the light-shielding component onto the display substrate covers an orthographic projection of the second light emitting component onto the display substrate; and the orthographic projection of the light-shielding component onto the display substrate partially overlaps with an orthographic projection of the light guide plate onto the display substrate;

the reflection sheet is disposed on a side of the backlight source distal from the display substrate, and is configured to reflect the light emitted by the backlight source; the diffusion sheet is disposed on a side of the backlight source close to the display substrate, and is configured to diffuse the light emitted by the backlight source; the prism sheet is disposed on a side of the diffusion sheet close to the display substrate, and is configured to increase luminance of a light emitted by the backlight source; the reflection sheet, the diffusion sheet and the prism sheet are all made of materials capable of transmitting the light of the target wavelength;

the second adhesive is disposed between the cover and the display substrate, and is configured to connect the cover and the display substrate;

one end of the flexible printed circuit is connected to a side of the display substrate distal from the shell, and the other end of the flexible printed circuit is disposed between the display substrate and the shell; the flexible printed circuit is provided with a second via; and the first light emitting component is connected to the display panel through the second via;

the sealant is disposed on a side of the display panel close to the shell, and is fixedly connected to the display panel; the sealant is provided with a third via; and an orthographic projection of the third via onto the display panel covers the fingerprint recognition sensor; the sealant includes an iron sheet and a third adhesive that is fixedly connected to the iron sheet; the third adhesive is disposed on an edge of the iron sheet and the third via is disposed in the iron sheet;

the first light emitting component includes at least one first light emitting element each emitting the light of the target wavelength, and the light of the target wavelength emitted by the at least one first light emitting element is irradiated to the fingerprint recognition area; each of the at least one first light emitting element is an infrared radiation light emitting diode; and the target wavelength is greater than or equal to 850 nm;

the second light emitting component includes at least one second light emitting element; light emitted by each of the at least one second light emitting element is homogenized by the light guide plate and then is irradiated to to the display substrate; each of the at least one second light emitting element is an organic light emitting diode; and the fingerprint recognition driving circuit is connected to the first light emitting component, and is configured to drive the first light emitting component to emit the light of the target wavelength; and the fingerprint recognition driving circuit is further connected to the fingerprint recognition sensor, and is configured to supply a driving signal to the fingerprint recognition sensor.

In another aspect, a method for manufacturing a display module is provided, including:

providing a shell; and disposing a display panel, a first light emitting component and a fingerprint recognition sensor in the shell; wherein the display panel is connected to the shell; the first light emitting component is connected to the display panel and is configured to emit light of the target wavelength; the fingerprint recognition sensor is disposed between the shell and the display panel and is fixedly connected to the shell; an orthographic projection of the fingerprint recognition sensor onto the display panel and an orthographic projection of the first light emitting component onto the display panel do not overlap; and the fingerprint recognition sensor is configured to recognize a fingerprint based on the received light of the target wavelength reflected by a obstacle.

Again in another aspect, a display device is provided, wherein the display device includes a power supply component and a display module that is connected to the power supply component, and the power supply component supplies power the display module; and the display module includes:

a shell;

a display panel, wherein the display panel is disposed in the shell and is connected to the shell;

a first light emitting component, wherein the first light emitting component is connected to the display panel and is configured to emit light of a target wavelength; and a fingerprint recognition sensor, wherein the fingerprint recognition sensor is disposed between the shell and the display panel and is fixedly connected to the shell; an orthographic projection of the fingerprint recognition sensor onto the display panel and an orthographic projection of the first light emitting component onto the display panel do not overlap; and the fingerprint recognition sensor is configured to recognize a fingerprint based on the received light of the target wavelength reflected by an obstacle.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art can still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
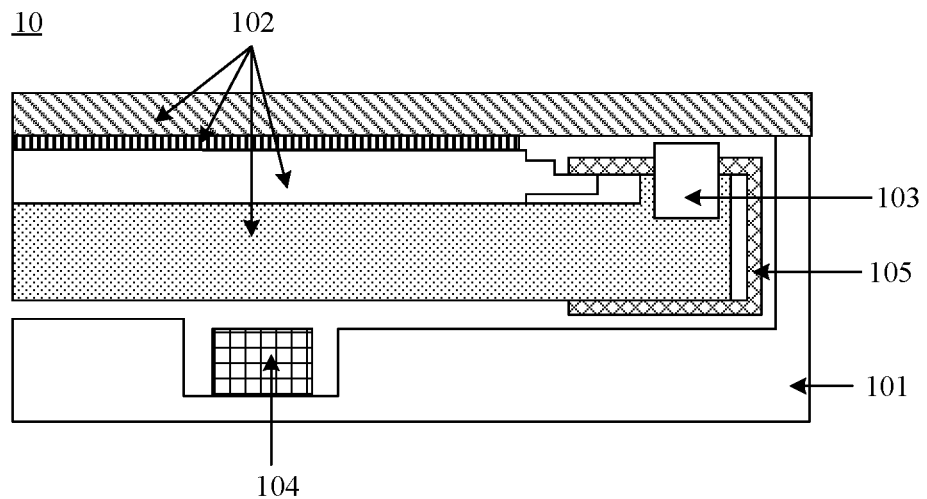
FIG. 1 is a schematic structural diagram of a display module according to an embodiment of the present disclosure.

FIG. 1 is a schematic structural diagram of a display module according to an embodiment of the present disclosure. As can be seen from FIG. 1, the display module 10 may include a shell 101, a display panel 102, a first light emitting component 103 and a fingerprint recognition sensor 104.

Here, the display panel 102 may be disposed in the shell 101 and be connected to the shell 101. The first light emitting component 103 may be connected to the display panel 102, and be configured to emit light of a target wavelength. The fingerprint recognition sensor 104 may be disposed between the shell 101 and the display panel 102, and be fixedly connected to the shell 101. An orthographic projection of the fingerprint recognition sensor 104 onto the display panel 102 and an orthographic projection of the first light emitting component 103 onto the display panel 102 do not overlap. The fingerprint recognition sensor 104 may be configured to recognize a fingerprint based on the received light of the target wavelength reflected by an obstacle.

In some embodiments of the present disclosure, because the first light emitting component 103 is connected to the display panel 102, the structural complexity of the shell 101 can be reduced compared with the solution in which the first light emitting component is directly connected to the shell, thus simplifying the manufacturing process of the shell 101. As such, the shell 101 in the display module 10 provided in the embodiments of the present disclosure has a simple structure and the weight thereof is relatively light, which helps to obtain a thinner and lighter display module.

In addition, as the orthographic projection of the fingerprint recognition sensor 104 onto the display panel 102 and the orthographic projection of the first light emitting component 103 onto the display panel 102 do not overlap, the light emitted by the first light emitting component 103 would not interfere with the light of the target wavelength reflected by the obstacle and then received by the fingerprint recognition sensor 104, which ensures the accuracy of the fingerprint recognition.

Optionally, the obstacle may be a finger of a user, and the light emitted by the light emitting component 103 may be reflected by the finger of the user. The fingerprint recognition sensor 104 may receive the light reflected by the finger of the user, and perform the fingerprint recognition based on the received light.

In summary, in the display module provided by some embodiments of the present disclosure, the first light emitting component of the display module is connected to the display panel, which can reduce the structural complexity of the shell and simplify the manufacturing process of the shell, compared with the solution in which the first light emitting component is directly connected to the shell. Moreover, as the structure of the shell in the display module provided by the embodiments of the present disclosure is relatively simple, the weight thereof can be relatively light, which helps to obtain a thinner and lighter display module.

Figure 2:
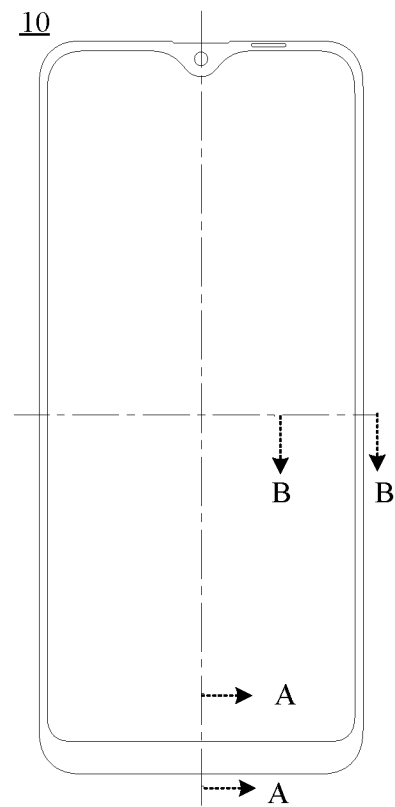
FIG. 2 is a schematic structural diagram of another display module according to an embodiment of the present disclosure.
Figure 3:
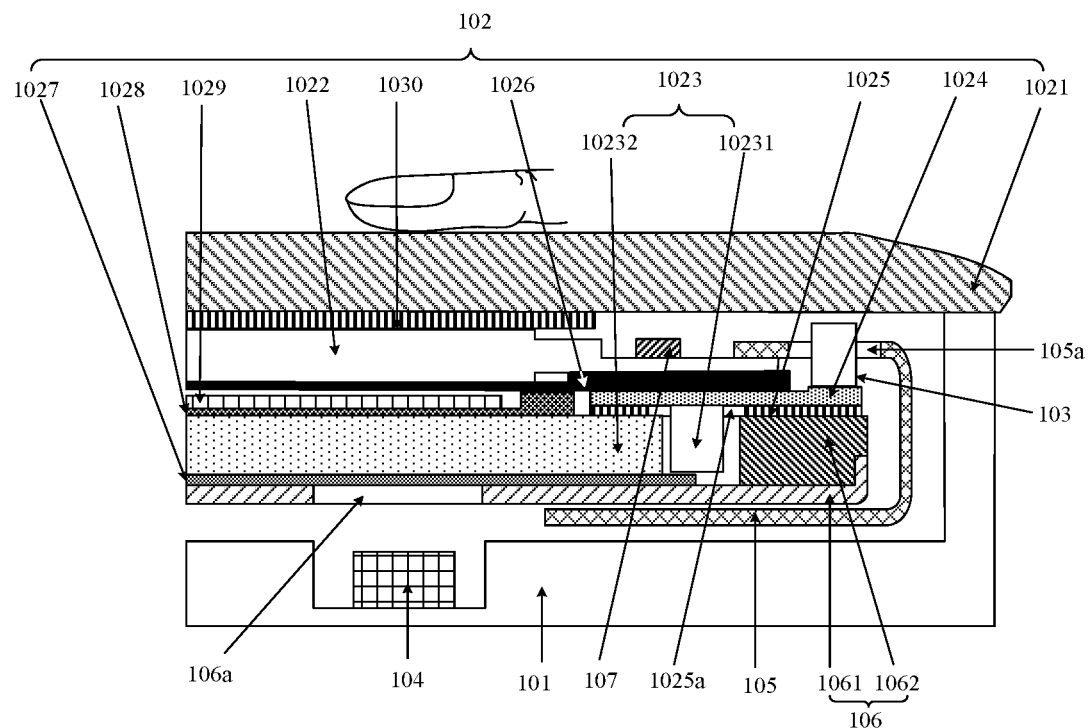
FIG. 3 is a sectional diagram of the display module in FIG. 2 along a direction of AA.

FIG. 2 is a schematic structural diagram of another display module according to an embodiment of the present disclosure. FIG. 3 is a sectional diagram of the display module in FIG. 2 along a direction of AA. Combining FIG. 2 and FIG. 3, it can be seen that the display panel 102 includes a cover 1021, a display substrate 1022, a backlight source (BLU) 1023 and a connection structure 1024.

Optionally, the cover 1021 may be connected to the shell 101. For example, the cover 1021 may be bonded to the shell 101 through a sealant. Here, the cover 1021 may be a cover glass.

The display substrate 1022, the backlight source 1023 and the connection structure 1024 may be located within the area enclosed by the cover 1021 and the shell 101. The display substrate 1022 may be connected to a side of the cover 1021 close to the shell 101. A side of the display substrate 1022 distal from the cover 1021 may be connected to an end of the connection structure 1024. A side of the connection structure 1024 distal from the display substrate 1022 may be connected to the backlight source 1023. The first light emitting component 103 may be disposed on a side of the connection structure 1024 distal from the backlight source 1023 and is connected to another end of the connection structure 1024.

That is, the display substrate 1022 and the first light emitting component 103 may be located on a same side of the connection structure 1024, wherein the display substrate 1022 may be connected to one end of the side of the connection structure 1024, and the first light emitting component 103 may be connected to the other end of the side of the connection structure 1024, The backlight source 1023 may be located on the other side of the connection structure 1024, and the backlight source 1023 may be connected to the other side of the connection structure 1024.

By disposing the connection structure 1024, the positions of the display substrate 1022, the first light emitting component 103 and the backlight source 1023 can be relatively fixed, which can avoid the displacement of the display substrate 1022, the first light emitting component 103 and the backlight source 1023, so as to further avoid the influence on the display effect of the display device and the accuracy of the fingerprint recognition.

Referring to FIG. 3, the backlight source 1023 may include a second light emitting component 10231 and a light guide plate 10232 (LGP). The second light emitting component 10231 may be disposed on a side of the connection structure 1024 distal from the display substrate 1022, and the second light emitting component 10231 may be connected to the side of the connection structure 1024 distal from the display substrate 1022.

In addition, an orthographic projection of the second light emitting component 10231 onto the connection structure 1024 and an orthographic projection of the first light emitting component 103 onto the connection structure 1024 do not overlap. However, the orthographic projection of the second light emitting component 10231 onto the connection structure 1024 and the orthographic projection of the first light emitting component 103 onto the connection structure 1024 may overlap, which is not limited in the embodiments of the present disclosure.

Referring to FIG. 3, the light guide plate 10232 may be disposed on a side of the second light emitting component 10231 distal from the first light emitting component 103. The second light emitting component 10231 may be disposed on an end of the light guide plate 10232 close to the first light emitting component 103. The second light emitting component 10231 can emit light, and the light emitted by the second light emitting component 10231 may be visible light. The light emitted by the second light emitting component 10231 is irradiated to the display substrate 1022 after being homogenized by the light guide plate 10232, thus providing backlight for the display substrate 1022.

After the light emitted by the second light emitting component 10231 is homogenized by the light guide plate 10232, the light emitted by the second light emitting component 10231 will be transformed into an area light source, as such, the area light source can provide uniform backlight for the display substrate 1022, ensuring the uniformity of brightness of the display substrate 1022.

Figure 4:
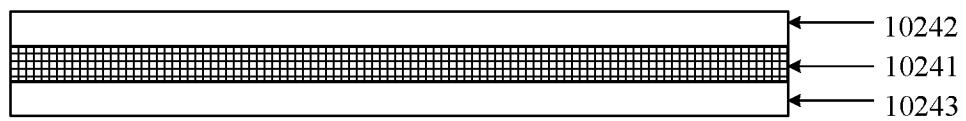
FIG. 4 is a schematic structural diagram of a connection structure according to an embodiment of the present disclosure.

In some embodiments of the present disclosure, the connection structure 1024 may be a flexible printed circuit. For example, referring to FIG. 4, the connection structure 1024 may include a base substrate 10241, and a first connection conductor 10242 and a second connection conductor 10243 which are respectively disposed on two sides of the base substrate 10241. Here, the base substrate 10241, the first connection conductor 10242 and the second connection conductor 10243 may all be of a plate-like structure. The first connection conductor 10242 may be connected to a first side of the base substrate 10241, and the second connection conductor 10243 may be connected to a second side of the base substrate 10241.

In some embodiments of the present disclosure, the first connection conductor 10242 is closer to the cover 1021 relative to the second connection conductor 10243. Thus, the display substrate 1022 and the first light emitting component 103 may both be connected to the side of the first connection conductor 10242 distal from the base substrate 10241, and the second light emitting component 10231 may be connected to side of the second connected conductor 10243 distal from the base substrate 10241.

Optionally, the first connection conductor 10242 and the second connection conductor 10243 are both made of copper. For example, the first connection conductor 10242 and the second connection conductor 10243 may both be copper conductors, and the copper conductors can be used to conduct electricity. A material of the base substrate 10241 may be poly carbonate (PC). In addition, the first light emitting component 103 may be welded to a side of the first connection conductor 10242 distal from the base substrate 10241. The second light emitting component 10231 may be welded to a side of the second connection conductor 10243 distal from the base substrate 10241.

Referring to FIG. 3, the display panel may further include a first adhesive 1025. One side of the first adhesive 1025 may be connected to a side of the connection structure 1024 distal from the display substrate 1022, and the other side of the first adhesive 1025 may be connected to the light guide plate 10232. Here, the first adhesive 1025 may be provided with a first via 1025a, and the second light emitting component 10231 may be connected to the connection structure 1024 through the first via 1025a.

Because the connection structure 1024 is connected to the light guide plate 10232 through the first adhesive 1025, the reliability of the connection between the connection structure 1024 and the light guide plate 10232 can be guaranteed. In addition, through the connection by the first adhesive 1025, no damage would be produced to the connection structure 1024 and the light guide plate 10232, and the yield rate of the display module 10 can be ensured. Furthermore, by providing the first via 1025a in the first adhesive 1025, the second light emitting component 10231 can be easily welded to the connection structure 1024. Optionally, the first adhesive 1025 may be a tape strip.

Referring to FIG. 3, the display panel 102 may further include a light-shielding component 1026. The light-shielding component 1026 may be disposed between the display substrate 1022 and the backlight source 1023, and an orthographic projection of the light-shielding component 1026 onto the display substrate 1022 may cover an orthographic projection of the second light emitting component 10231 onto the display substrate 1022.

By disposing the light-shielding component 1026 in the display panel 102, the light emitted by the second light emitting component 10231 can be avoided from leaking from an edge of the display substrate 1022, which can improve the display effect of the display device. Optionally, the light-shielding component 1026 may be a light-shielding tape.

Figure 5:
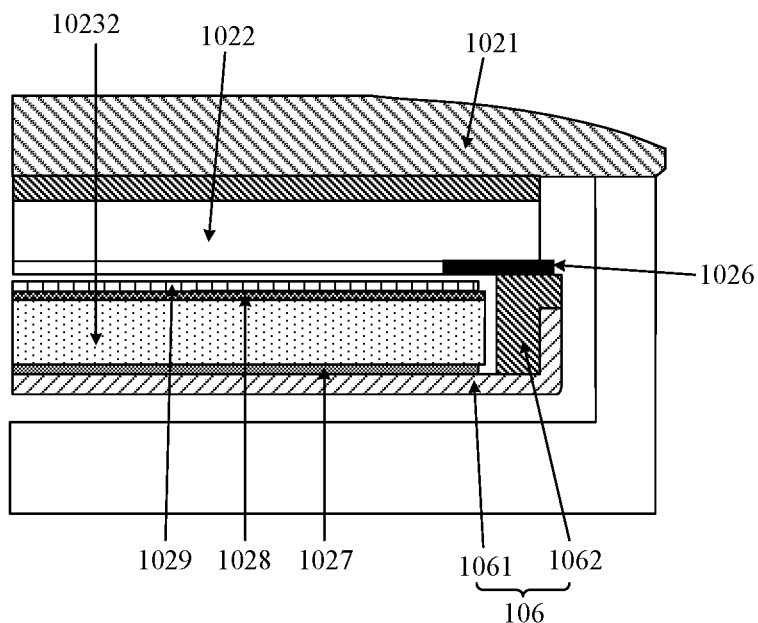
FIG. 5 is a sectional diagram of the display module in FIG. 2 along a direction of BB.

FIG. 5 is a sectional diagram of the display module in FIG. 2 along a direction of BB. Combining FIG. 3 and FIG. 5, it can be seen that an orthographic projection of the light-shielding component 1026 onto the display substrate 1022 may partially overlap with an orthographic projection of the light guide plate 10232 onto the display substrate

1022. For example, the orthographic projection of the light-shielding component 1026 onto the display substrate 1022 may enclose an orthographic projection of an edge area of the light guide plate 10232 onto the display substrate 1022.

Because the light guide plate 10232 can homogenize the light emitted by the second light emitting component 10231, each area of the light guide plate 10232 would be dispersed with light. In this way, by covering the edge area of the light guide plate 10232 with the light-shielding component 1026, the light emitted by the edge area of the light guide plate 10232 can be prevented from irradiating to an edge of the display substrate 1022, which can avoid that the light leaks out from the edge of the display substrate 1022, thus improving the display effect of the display device.

In addition, referring to FIG. 5, the middle area of the light guide plate 10232 is not covered by the light-shielding component 1026, thus the light emitted from the middle area of the light guide plate 10232 can provide backlight for the display substrate 1022, so as to enable the display device to normally display images.

In some embodiments of the present disclosure, referring to FIG. 3 and FIG. 5, the display panel 102 may further include a reflection sheet 1027, a diffusion sheet 1028 and a prism sheet 1029. The reflection sheet 1027 may be disposed on a side of the backlight source 1023 distal from the display substrate 1022, and is configured to reflect the light emitted by the backlight source 1023. The diffusion sheet 1028 may be disposed on a side of the backlight source 1023 close to the display substrate 1022, and is configured to diffuse the light emitted by the backlight source 1023. The prism sheet 1029 may be disposed on a side of the diffusion sheet 1028 close to the display substrate 1022, and is configured to increase the light luminance of the light emitted by the backlight source 1023.

Optionally, the reflection sheet 1027 may be made of a material capable of transmitting the light of the target wavelength. Thus, the reflection sheet 1027 can be configured to transmit the light of the target wavelength and reflect the light having a wavelength other than the target wavelength. That is, the reflection sheet 1027 can transmit the light emitted by the first light emitting component 103 and the light reflected by the obstacle, and reflect other light than the light emitted by the first light emitting component 103 and the light reflected by the obstacle (for example, the reflection sheet 1027 may reflect the light emitted by the second light emitting component 10231 of the backlight source 1023).

By disposing the reflection sheet 1027 in the display panel 102, on one hand, the light reflected by the obstacle can be transmitted to the fingerprint recognition sensor 104 to ensure the normal operation of fingerprint recognition, and on the other hand, the light emitted by the second light emitting component 10231 can be reflected, so that the light emitted by the second light emitting component 10231 is irradiated to the display substrate 1022 after passing through the light guide plate 10232, thereby improving the brightness of the display substrate 1022. In addition, the reflection sheet 1027 can prevent the light having other wavelengths from interfering with the fingerprint recognition sensor 104, which ensures the reliability of the fingerprint recognition.

In some embodiments of the present disclosure, the diffusion sheet 1028 will scatter the light irradiated to the diffusion sheet 1028. After the light emitted by the second light emitting component 10231 is homogenized by the light guide plate 10232, a part of the light may be directly irradiated to the diffusion sheet 1028, and then be irradiated to the display substrate 1022 after the scattering effect of the diffusion sheet 1028. Another part of the light may be irradiated to the reflection sheet 1027, then be irradiated to the diffusion sheet 1028 after being reflected by the reflection sheet 1027, and further be irradiated to the display substrate 1022 after being scattered by the diffusion sheet 1028.

In addition, by disposing the prism sheet 1029 in the display panel 102, the light luminance of light emitted by the second light emitting component of the backlight source 1023 can be increased, that is, the light luminance of light irradiated to the display substrate 1022 can be increased, which can further improve the display effect of the display device.

In some embodiments of the present disclosure, after the first light emitting component 103 emits the light of the target wavelength, the obstacle may reflect the light of the target wavelength. In addition, the light of the target wavelength reflected by the obstacle may sequentially pass through the cover 1021, the display substrate 1022, the prism sheet 1029, the diffusion sheet 1028, the light guide plate 10232, and the reflection sheet 1027 in turns, and then irradiate to the fingerprint recognition sensor 104. The fingerprint recognition sensor 104 can then perform the fingerprint recognition based on the received light of the target wavelength reflected by the obstacle.

Because the light of the target wavelength reflected by the obstacle needs to pass through the diffusion sheet 1028 and the prism sheet 1029 to irradiate to the fingerprint recognition sensor 104, both the diffusion sheet 1028 and the prism sheet 1029 are made of materials capable of transmitting the light of the target wavelength.

Referring to FIG. 3 and FIG. 5, the display panel 102 may further include a second adhesive 1030. The second adhesive 1030 may be disposed between the cover 1021 and the display substrate 1022, and is used to connect the cover 1021 and the display substrate 1022.

Optionally, a material of the second adhesive 1030 may be optically clear adhesive (OCA), and the cover 1021 and the display substrate 1022 are bonded by the OCA.

Referring to FIG. 1 and FIG. 3, the display module 10 may further include a flexible printed circuit (FPC) 105. One end of the flexible printed circuit 105 may be connected to a side of the display substrate 1022 distal from the shell 101, and the other end of the flexible printed circuit 105 may be disposed between the display substrate 1022 and the shell 101. The flexible printed circuit 105 may be provided with a second via 105*a*; and the first light emitting component 103 may be connected to the display panel 102 through the second via 105*a*.

Because the other end of the flexible printed circuit 105 can be bent to a side of the display substrate 1022 close to the shell 101, it can avoid that the flexible printed circuit 105 occupies too much space, and the screen-to-body ratio of the display module 10 can be increased. In addition, the flexible printed circuit 105 is provided with a second via 105*a*, so that the first light emitting component 103 can be connected to the connection structure 1024 after passing through the second via 105*a*. As such, the light of the target wavelength emitted by first light emitting component 103 would not be blocked by the flexible printed circuit 105, thus ensuring that the light of the target wavelength emitted by the first light-emitting component 103 can be emitted and the reliability of the fingerprint recognition can be increased.

Referring to FIG. 3 and FIG. 5, the display module 10 may further include a sealant 106. The sealant 106 may be disposed on a side of the display panel 102 close to the shell 101, and the sealant 106 may be connected to the display panel 102. The sealant 106 can be used to fix the display panel 102, so as to avoid the displacement of the display panel 102 in the shell 101, thereby ensuring the stability of the display module 10.

In addition, referring to FIG. 3, in the area of the display module where the connection structure 1024 and the first adhesive 1025 are disposed, the side of the sealant 106 close to the display substrate 1022 may be connected to the first adhesive 1025, and the light-shielding component 1026 may be connected to the connection structure 1024. Referring to FIG. 5, in an area of the display module 10 where the connection structure 1024 and the first adhesive 1025 are not disposed, the side of the sealant 106 close to the display substrate 1022 may be directly connected to the light-shielding component 1026.

In some embodiments of the present disclosure, the sealant 106 may be an integration of glue and iron. The sealant 106 may include an iron sheet 1061 and a third adhesive 1062 that is fixedly connected to the iron sheet 1061. An orthographic projection of the iron sheet 1061 onto the display substrate 1022 may cover an orthographic projection of the backlight source 1023 onto the display substrate 1022. An orthographic projection of the third adhesive 1062 onto the display substrate 1022 and the orthographic projection of the backlight source 1023 onto the display substrate 1022 do not overlap. The third adhesive 1062 may be disposed on an edge of the iron sheet 1061 and is used to connect to the first adhesive 1025 or the light-shielding component 1026.

Here, the sealant 106 may be provided with a third via 106a, and an orthographic projection of the third via 106a onto the display panel 102 may cover the fingerprint recognition sensor 104. For example, the third via 106a in FIG. 3 is disposed in the iron sheet 1061.

Because the iron sheet 1061 cannot transmit light (including the light of the target wavelength reflected by the obstacle), the iron sheet 1061 is provided with a third via 106a, so that the light of the target wavelength reflected by the obstacle can be transmitted through the third via 106a and arrive at the fingerprint recognition sensor 104. Thus, the fingerprint recognition sensor 104 can accurately receive the light of the target wavelength reflected by the obstacle, and the fingerprint recognition has a relatively high accuracy.

Figure 6:
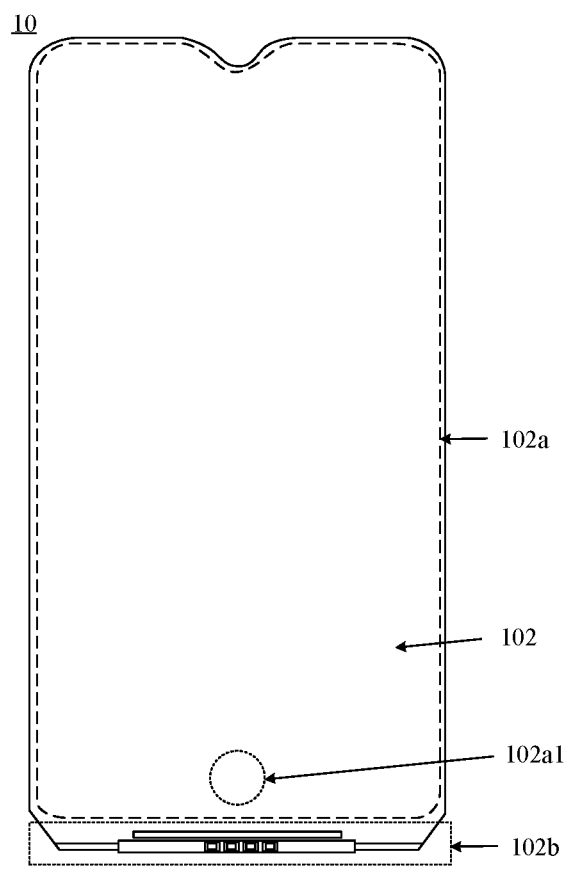
FIG. 6 is a schematic structural diagram of still another display module according to an embodiment of the present disclosure.
Figure 7:
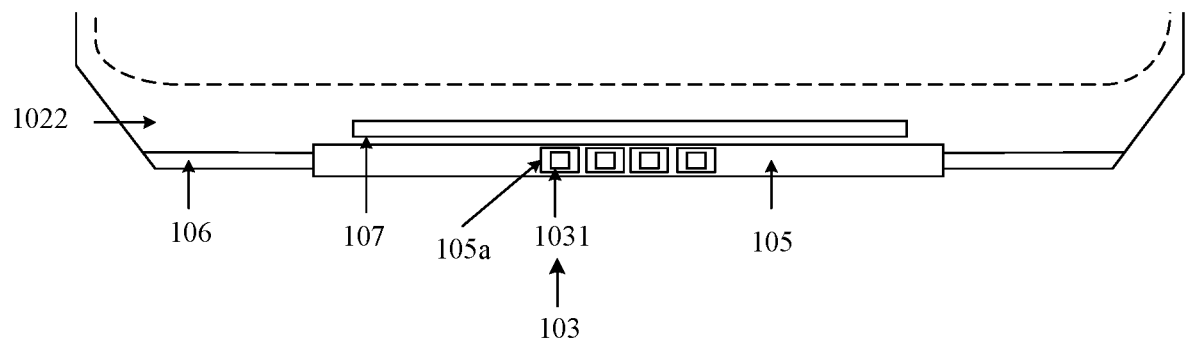
FIG. 7 is a schematic partial structural diagram of a display module in FIG. 6.

FIG. 6 is a schematic structural diagram of still another display module according to an embodiment of the present disclosure. FIG. 7 is a schematic partial structural diagram of the display module in FIG. 6. Referring to FIG. 6, the display panel 102 may include a display area 102a and a bonding area 102b disposed on a side of the display area 102a. The display area 102a includes a fingerprint recognition area 102a1. An orthographic projection of the fingerprint recognition sensor 104 onto the display panel 102 may be located within the fingerprint recognition area 102a1.

Referring to FIG. 7, the first light emitting component 103 may include at least one first light emitting element 1031. Each first light emitting element 1031 may emit the light of the target wavelength, and the light of the target wavelength emitted by each first light emitting element 1031 may irradiate to the fingerprint recognition area 102a1 of the display substrate 1022.

In addition, referring to FIG. 7, the flexible printed circuit 105 may be provided with at least one second via 105a in a one-to-one correspondence with the at least one first light emitting element 1031. Each first light emitting element 1031 may be disposed within one corresponding second via 105a, so as to prevent the flexible printed circuit 105 from influencing the light of the target wavelength emitted by the first light emitting element 1031.

For example, FIG. 7 shows four first light emitting elements 1031 arranged at intervals. Correspondingly, the flexible printed circuit 105 may be provided with four second vias 105a.

Optionally, each first light emitting element 1031 may be infrared radiation light emitting diode (IR LED). The target wavelength may be greater than or equal to 850 nm. That is, the light emitted by the infrared radiation light emitting diode is infrared light. Correspondingly, the fingerprint recognition sensor 104 may be infrared radiation sensor (IR sensor).

Referring to FIG. 3 and FIG. 7, the display module 10 may further include a driver integrated circuit (driver IC) 107. The driver IC 107 may be located in the bonding area 102b and be disposed on the side of the display substrate 1022 distal from the shell 101. The driver IC 107 may be connected to each sub-pixel in display panel 102, so as to provide driving signals for each sub-pixel and enable the display device to normally display image. Here, in order to clearly show the driver IC 107 and the first light emitting component 103, the cover 1021 is not shown in FIG. 6 and FIG. 7.

If the driver IC 107 is disposed at the end of the flexible printed circuit 105 between the display substrate 1022 and the shell 101, the tracing lines connecting the driver IC 107 and each sub-pixel in the display panel 102 need to be disposed on the flexible printed circuit 105, resulting in too many lines disposed on the flexible printed circuit 105. In this case, it may be difficult to avoid covering the second via 105a, which may in turn influence the light of the target wavelength emitted by the first light emitting component 103.

By disposing the driver IC 107 on a side of the display substrate 1022 distal from the shell 101, the tracing lines connecting the driver IC 107 and the sub-pixels of the display panel 102 can be avoided from being disposed on the flexible printed circuit 105. With fewer tracing lines disposed on the flexible circuit board 105, the second via 105a in the flexible printed circuit 105 can be avoided from being covered, thereby preventing the tracing lines on the flexible printed circuit 105 from influencing the light of the target wavelength emitted by the first light emitting component 103, which ensures the accuracy of the fingerprint recognition.

In some embodiments of the present disclosure, the second light emitting component 10231 may include at least one second light emitting element (not shown in figures). The light emitted by each second light emitting element may be homogenized by the light guide plate 10232 and then irradiates to the display substrate 1022. Optionally, the second light emitting element may be an organic light emitting diode (LED). The color of the light emitted by the second light emitting element may be white.

Because each second light emitting element needs to be connected to the connection structure 1024, the first adhesive 1025 may be provided with at least one first via 1025a in a one-to-one correspondence with the at least one second light emitting element, and each second light emitting element is connected to the connection structure 1024 through the corresponding first via 1025a.

Figure 8:
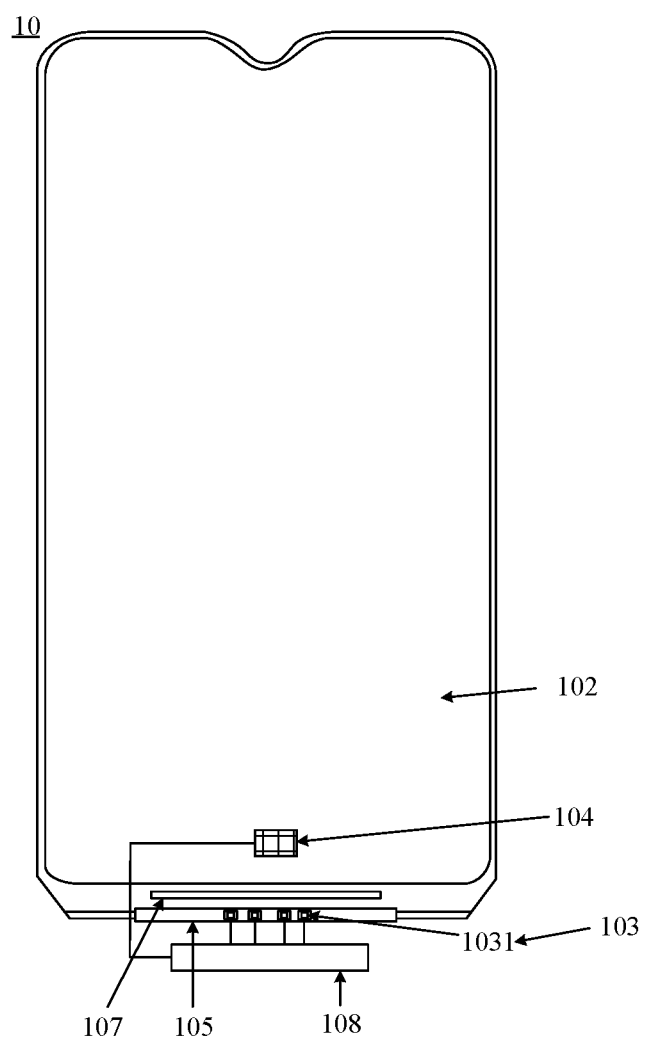
FIG. 8 is a schematic structural diagram of yet another display module according to an embodiment of the present disclosure.

FIG. 8 is a schematic structural diagram of yet another display module according to an embodiment of the present disclosure. Referring to FIG. 8, the display module may further include a fingerprint recognition driving circuit 108. The fingerprint recognition driving circuit 108 may be connected to the first light emitting component 103, to drive the first light emitting component 103 to emit the light of the target wavelength.

For example, the first light emitting component 103 in FIG. 8 may include four first light emitting elements 1031, and the fingerprint recognition driving circuit 108 may be connected with each of the first light emitting elements 1031.

In addition, the fingerprint recognition driving circuit 108 may be further connected with the fingerprint recognition sensor 104, to supply driving signals to the fingerprint recognition sensor 104. The fingerprint recognition sensor 104 may recognize a fingerprint under the action of the driving signals provided by the fingerprint recognition driving circuit 108.

Because the fingerprint recognition sensor 104 is disposed between the shell 101 and the end of the flexible printed circuit 105 between the display substrate 1022 and the shell 101, the fingerprint recognition driving circuit 108 may also be disposed at this end of the flexible printed circuit 105, i.e., the end of the flexible printed circuit 105 between the display substrate 1022 and the shell 101, so as to facilitate the connection between the fingerprint recognition driving circuit 108 and the fingerprint recognition sensor 104.

Furthermore, as the first light emitting component 103 is disposed at the end of the flexible printed circuit 105 connected with the display substrate 1022, the tracing lines connecting the fingerprint recognition driving circuit 108 and the first light emitting component 103 may be disposed on the flexible printed circuit 105.

In summary, in the display module provided by some embodiments of the present disclosure, the first light emitting component included in the display module is connected to the display panel, which can reduce the structural complexity of the shell and simplify the manufacturing process of the shell, compared with the solution in which the first light emitting component is directly connected to the shell. Moreover, as the structure of the shell in the display module provided by the embodiments of the present disclosure is relatively simple, the weight thereof can be relatively light, which helps to obtain a thinner and lighter display module.

Figure 9:
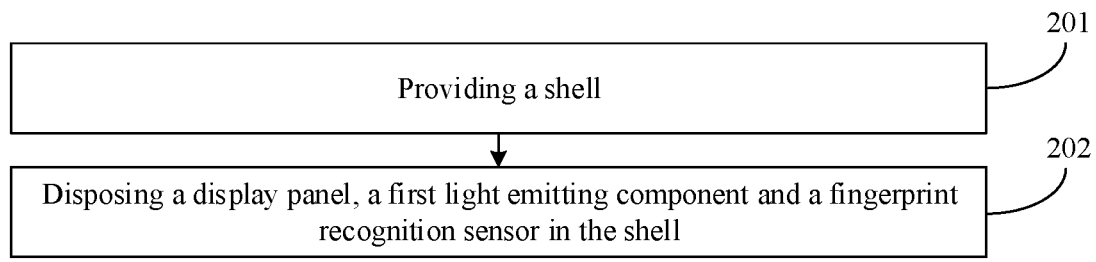
FIG. 9 is a flow chart showing a method for manufacturing a display module according to an embodiment of the present disclosure.

FIG. 9 is a flow chart showing a method for manufacturing a display module according to an embodiment of the present disclosure. For example, the manufacturing method can be used in manufacturing the display module 10 provided in the foregoing embodiments of the present disclosure. Referring to FIG. 9, the method may include the following steps.

In step 201, a shell is provided.

In step 202, a display panel, a first light emitting component and a fingerprint recognition sensor are disposed in the shell.

Here, the display panel 102 is connected to the shell 101. The first light emitting component 103 may be connected to the display panel 102 and is configured to emit light of a target wavelength. The fingerprint recognition sensor 104 is disposed between the shell 101 and the display panel 102 and is fixedly connected to the shell 101. An orthographic projection of the fingerprint recognition sensor 104 onto the display panel 102 and an orthographic projection of the first light emitting component 103 onto the display panel 102 do not overlap. The fingerprint recognition sensor 104 may be configured to perform the fingerprint recognition based on the received light of the target wavelength reflected by an obstacle.

In the embodiments of the present disclosure, because the first light emitting component 103 is connected to the display panel 102 in the obtained display module 10, the structural complexity of the shell 101 can be reduced compared with the solution in which the first light emitting component is directly connected to the shell, thus simplifying the manufacturing process of the shell 101. As such, the shell 101 in the display module 10 provided in the embodiments of the present disclosure has a simple structure and the weight thereof is relatively light, which helps to obtain a thinner and lighter display module.

In addition, because the orthographic projection of the fingerprint recognition sensor 104 onto the display panel 102 and the orthographic projection of the first light emitting component 103 onto the display panel 102 do not overlap, the light emitted by the first light emitting component 103 would not interfere with the light of the target wavelength reflected by the obstacle and then received by the fingerprint recognition sensor 104, which ensures the accuracy of the fingerprint recognition.

Optionally, the obstacle may be a finger of a user, and the light emitted by the light emitting component 103 is reflected by the finger of the user. The fingerprint recognition sensor 104 may receive the light reflected by the finger of the user, and perform the fingerprint recognition based on the received light.

In summary, in the method for manufacturing a display module provided by some embodiments of the present disclosure, the first light emitting component of the display module prepared by the method is connected to the display panel, which can reduce the structural complexity of the shell and simplify the manufacturing process of the shell, compared with the solution in which the first light emitting component is directly connected to the shell. Moreover, as the structure of the shell in the display module prepared in the embodiments of the present disclosure is relatively simple, the weight thereof can be relatively light, which helps to obtain a thinner and lighter display module.

Figure 10:
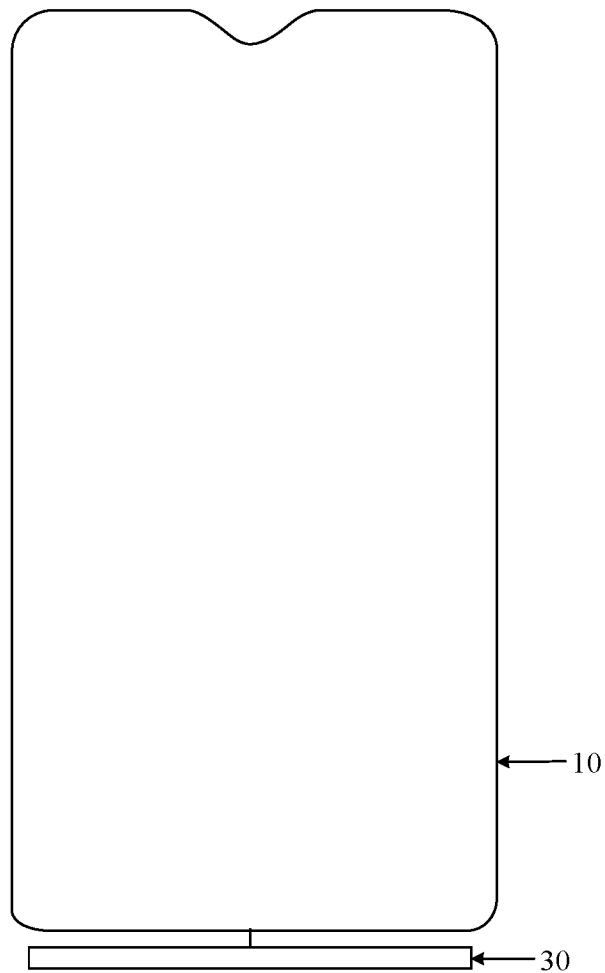
FIG. 10 is a schematic structural diagram of a display device according to an embodiment of the present disclosure.

FIG. 10 is a schematic structural diagram of a display device according to an embodiment of the present disclosure. The display device may include a power supply component 30 and a display module that is connected to the power supply component 30. Here, the display module may be the display module 10 provided in the foregoing embodiments of the present disclosure.

Optionally, the display panel 102 in the display module 10 may be a liquid crystal display (LCD). Correspondingly, the display device may be a liquid crystal display device. Certainly, the display device may be any product or component with a display function and a fingerprint recognition function, such as electronic paper, a mobile phone, a tablet computer, a television, a display, a notebook computer, a digital photo frame, a navigator or the like.

Described above are merely exemplary embodiments of the present disclosure, and are not intended to limit the present disclosure. Any modifications, equivalent substitutions, improvements and the like made under the spirit and principles of the present disclosure should be included within the scope of protection of the present disclosure.

What is claimed is:
1. A display module, comprising:
a shell;
a display panel, wherein the display panel is disposed in the shell and is connected to the shell;
a first light emitting component, wherein the first light emitting component is connected to the display panel and is configured to emit light of a target wavelength; and a fingerprint recognition sensor, wherein the fingerprint recognition sensor is disposed between the shell and the display panel and is fixedly connected to the shell;

an orthographic projection of the fingerprint recognition sensor onto the display panel and an orthographic projection of the first light emitting component onto the display panel do not overlap; and the fingerprint recognition sensor is configured to recognize a fingerprint based on received light of the target wavelength reflected by an obstacle;

wherein the display panel comprises a cover, a display substrate, a backlight source and a connection structure;

the cover is connected to the shell; and the display substrate, the backlight source and the connection structure are located in a region enclosed by the cover and the shell;

the display substrate is connected to a side of the cover close to the shell; a side of the display substrate distal from the cover is connected to an end of the connection structure; and a side of the connection structure distal from the display substrate is connected to the backlight source; and the first light emitting component is disposed on a side of the connection structure distal from the backlight source and is connected to another end of the connection structure; and the display module further comprises a flexible printed circuit;

one end of the flexible printed circuit is connected to a side of the display substrate distal from the shell, and the other end of the flexible printed circuit is disposed between the display substrate and the shell; and the flexible printed circuit is provided with a second via; and the first light emitting component is connected to the display panel through the second via.

2. The display module according to claim 1, wherein the backlight source comprises a second light emitting component and light guide plate;

the second light emitting component is disposed on the side of the connection structure distal from the display substrate; and an orthographic projection of the second light emitting component onto the connection structure and an orthographic projection of the first light emitting component onto the connection structure do not overlap; and the light guide plate is disposed on a side of the second light emitting component distal from the first light emitting component.

3. The display module according to claim 2, wherein the connection structure comprises a substrate, and a first connection conductor and a second connection conductor which are respectively disposed on either side of the substrate; and both of the display substrate and the first light emitting component are connected to the first connection conductor; and the second light emitting component is connected to the second connection conductor.

4. The display module according to claim 3, the first connection conductor and the second connection conductor are made of copper.

5. The display module according to claim 4, wherein the display panel comprises a display area and the display area comprises a fingerprint recognition area; an orthographic projection of the fingerprint recognition sensor onto the display panel is located within the fingerprint recognition area; the display panel further comprises a first adhesive, a light-shielding component, a reflection sheet, a diffusion sheet, a prism sheet, a second adhesive, a sealant and a fingerprint recognition driving circuit;

one side of the first adhesive is connected to a side of the connection structure distal from the display substrate, and the other side of the first adhesive is connected to the light guide plate; wherein the first adhesive is provided with a first via; and the second light emitting component is connected to the connection structure through the first via;

the light-shielding component is disposed between the display substrate and the backlight source; an orthographic projection of the light-shielding component onto the display substrate covers an orthographic projection of the second light emitting component onto the display substrate; and the orthographic projection of the light-shielding component onto the display substrate partially overlaps with an orthographic projection of the light guide plate onto the display substrate;

the reflection sheet is disposed on a side of the backlight source distal from the display substrate, and is configured to reflect the light emitted by the backlight source; the diffusion sheet is disposed on a side of the backlight source close to the display substrate, and is configured to diffuse the light emitted by the backlight source; the prism sheet is disposed on a side of the diffusion sheet close to the display substrate, and is configured to increase luminance of the light emitted by the backlight source; the reflection sheet, the diffusion sheet and the prism sheet are all made of materials capable of transmitting the light of the target wavelength;

the second adhesive is disposed between the cover and the display substrate, and is configured to connect the cover and the display substrate;

the sealant is disposed on a side of the display panel close to the shell, and is fixedly connected to the display panel; the sealant is provided with a third via; and an orthographic projection of the third via onto the display panel covers the fingerprint recognition sensor; the sealant comprises an iron sheet and a third adhesive that is fixedly connected to the iron sheet; the third adhesive is disposed on an edge of the iron sheet and the third via is disposed in the iron sheet;

the first light emitting component comprises at least one first light emitting element each emitting the light of the target wavelength, and the light of the target wavelength emitted by the at least one first light emitting element is irradiated to the fingerprint recognition area; each of the at least one first light emitting element is an infrared radiation light emitting diode; and the target wavelength is greater than or equal to 850 nm;

the second light emitting component comprises at least one second light emitting element; light emitted by each of the at least one second light emitting element is homogenized by the light guide plate and then is irradiated to the display substrate; each of the at least one second light emitting element is an organic light emitting diode; and the fingerprint recognition driving circuit is connected to the first light emitting component, and is configured to drive the first light emitting component to emit the light of the target wavelength; and the fingerprint recognition driving circuit is further connected to the fingerprint recognition sensor, and is configured to supply a driving signal to the fingerprint recognition sensor.

6. The display module according to claim 2, wherein the display panel further comprises a first adhesive;

one side of the first adhesive is connected to a side of the connection structure distal from the display substrate, and the other side of the first adhesive is connected to the light guide plate; wherein the first adhesive is provided with a first via; and the second light emitting component is connected to the connection structure through the first via.

7. The display module according to claim 2, wherein the display panel further comprises light-shielding component;

the light-shielding component is disposed between the display substrate and the backlight source; and an orthographic projection of the light-shielding component onto the display substrate covers an orthographic projection of the second light emitting component onto the display substrate.

8. The display module according to claim 7, wherein the orthographic projection of the light-shielding component onto the display substrate partially overlaps with an orthographic projection of the light guide plate onto the display substrate.

9. The display module according to claim 1, wherein the display panel further comprises a reflection sheet, a diffusion sheet and a prism sheet;

the reflection sheet is disposed on a side of the backlight source distal from the display substrate, and is configured to reflect light emitted by the backlight source;

the diffusion sheet is disposed on a side of the backlight source close to the display substrate, and is configured to diffuse the light emitted by the backlight source; and the prism sheet is disposed on a side of the diffusion sheet close to the display substrate, and is configured to increase luminance of the light emitted by the backlight source.

10. The display module according to claim 9, the reflection sheet, the diffusion sheet and the prism sheet are all made of materials capable of transmitting the light of the target wavelength.

11. The display module according to claim 1, wherein the display panel further comprises a second adhesive; and the second adhesive is disposed between the cover and the display substrate, and is configured to connect the cover and the display substrate.

12. The display module according to claim 1, wherein the display module further comprises a sealant; and the sealant is disposed on a side of the display panel close to the shell, and the sealant is fixedly connected to the display panel.

13. The display module according to claim 12, wherein the sealant is provided with a third via; and an orthographic projection of the third via onto the display panel covers the fingerprint recognition sensor.

14. The display module according to claim 1, wherein the display panel comprises a display area and the display area comprises a fingerprint recognition area; and an orthographic projection of the fingerprint recognition sensor onto the display panel is located within the fingerprint recognition area; and the first light emitting component comprises at least one first light emitting element each emitting the light of the target wavelength, and the light of the target wavelength emitted by the at least one first light emitting element is irradiated to the fingerprint recognition area.

15. The display module according to claim 14, wherein each of the at least one first light emitting element is an infrared radiation light emitting diode; and the target wavelength is greater than or equal to 850 nm.

16. The display module according to claim 1, wherein the display module further comprises a fingerprint recognition driving circuit;

the fingerprint recognition driving circuit is connected to the first light emitting component and is configured to drive the first light emitting component to emit the light of the target wavelength; and the fingerprint recognition driving circuit is further connected to the fingerprint recognition sensor and is configured to supply a driving signal to the fingerprint recognition sensor.

17. A method for manufacturing a display module, comprising:

providing a shell; and disposing a display panel, a first light emitting component and a fingerprint recognition sensor in the shell;

wherein the display panel is connected to the shell; the first light emitting component is connected to the display panel and is configured to emit light of a target wavelength; the fingerprint recognition sensor is disposed between the shell and the display panel and is fixedly connected to the shell; an orthographic projection of the fingerprint recognition sensor onto the display panel and an orthographic projection of the first light emitting component onto the display panel do not overlap; and the fingerprint recognition sensor is configured to recognize a fingerprint based on the received light of the target wavelength reflected by an obstacle;

wherein the display panel comprises a cover, a display substrate, a backlight source and a connection structure;

the cover is connected to the shell; and the display substrate, the backlight source and the connection structure are located in a region enclosed by the cover and the shell;

the display substrate is connected to a side of the cover close to the shell; a side of the display substrate distal from the cover is connected to an end of the connection structure; and a side of the connection structure distal from the display substrate is connected to the backlight source; and the first light emitting component is disposed on a side of the connection structure distal from the backlight source and is connected to another end of the connection structure; and the display module further comprises a flexible printed circuit;

one end of the flexible printed circuit is connected to a side of the display substrate distal from the shell, and the other end of the flexible printed circuit is disposed between the display substrate and the shell; and the flexible printed circuit is provided with a second via; and the first light emitting component is connected to the display panel through the second via.

18. A display device, comprising a power supply component and a display module that is connected to the power supply component, wherein the power supply component is configured to supply power to the display module; and the display module comprises:

a shell;

a display panel, wherein the display panel is disposed in the shell and is connected to the shell;

a first light emitting component, wherein the first light emitting component is connected to the display panel and is configured to emit light of a target wavelength; and a fingerprint recognition sensor, wherein the fingerprint recognition sensor is disposed between the shell and the display panel and is fixedly connected to the shell;

an orthographic projection of the fingerprint recognition sensor onto the display panel and an orthographic projection of the first light emitting component onto the display panel do not overlap; and the fingerprint recognition sensor is configured to recognize a fingerprint based on the received light of the target wavelength reflected by an obstacle;

wherein the display panel comprises a cover, a display substrate, a backlight source and a connection structure;

the cover is connected to the shell; and the display substrate, the backlight source and the connection structure are located in a region enclosed by the cover and the shell;

the display substrate is connected to a side of the cover close to the shell; a side of the display substrate distal from the cover is connected to an end of the connection structure; and a side of the connection structure distal from the display substrate is connected to the backlight source; and the first light emitting component is disposed on a side of the connection structure distal from the backlight source and is connected to another end of the connection structure; and the display module further comprises a flexible printed circuit;

one end of the flexible printed circuit is connected to a side of the display substrate distal from the shell, and the other end of the flexible printed circuit is disposed between the display substrate and the shell; and the flexible printed circuit is provided with a second via; and the first light emitting component is connected to the display panel through the second via.

\* \* \* \* \*